(12) United States Patent
Sakai et al.

(10) Patent No.: US 11,142,139 B2
(45) Date of Patent: Oct. 12, 2021

(54) VEHICLE TRIM STRUCTURE

(71) Applicants: NIFCO INC., Yokosuka (JP);
TOYOTA JIDOSHA KABUSHIKI KAISHA, Toyota (JP)

(72) Inventors: Masaru Sakai, Yokosuka (JP); Kentaro Ahiko, Yokosuka (JP); Kimiharu Mishima, Tokai (JP)

(73) Assignee: NIFCO INC., Kanagawa (JP)

( * ) Notice: Subject to any disclaimer, the term of this patent is extended or adjusted under 35 U.S.C. 154(b) by 104 days.

(21) Appl. No.: 16/580,591

(22) Filed: Sep. 24, 2019

(65) Prior Publication Data

US 2020/0094752 A1    Mar. 26, 2020

(30) Foreign Application Priority Data

Sep. 26, 2018   (JP) .............................. JP2018-180743

(51) Int. Cl.
*B60R 13/02*      (2006.01)
*B60R 11/02*      (2006.01)
*B60R 11/00*      (2006.01)

(52) U.S. Cl.
CPC ........ *B60R 13/025* (2013.01); *B60R 11/0229* (2013.01); *B60R 2011/004* (2013.01); *B60R 2013/0293* (2013.01)

(58) Field of Classification Search
CPC ............... B60R 12/025; B60R 11/0229; B60R 2011/004; B60R 2013/0293
See application file for complete search history.

(56) References Cited

U.S. PATENT DOCUMENTS

| 9,555,747 | B2* | 1/2017 | Musy .................. B29C 66/7392 |
| 2002/0164200 | A1 | 11/2002 | Wisniewski |
| 2008/0122251 | A1* | 5/2008 | Okajima .................. B60J 10/24 296/146.9 |
| 2009/0133335 | A1* | 5/2009 | Tamura .................... B60J 10/18 49/489.1 |
| 2010/0239826 | A1* | 9/2010 | Hiroe ....................... B60J 10/32 428/174 |
| 2016/0185300 | A1* | 6/2016 | Parlow .................. B60R 13/025 296/37.13 |

FOREIGN PATENT DOCUMENTS

JP    3579588 B2    10/2004

OTHER PUBLICATIONS

Office Action for Japanese Patent Application No. 2018-180743 dated Aug. 4, 2020, pp. 1-5 (English translation included).

* cited by examiner

*Primary Examiner* — Lori L Lyjak
(74) *Attorney, Agent, or Firm* — Thomas|Horstemeyer, LLP (57) ABSTRACT

A vehicle trim structure includes a flange provided at a vehicle trim and configured to contact a counterpart member, wherein an end portion of the flange that is configured to contact the counterpart member is formed from a soft material, and a contact face of the end portion is configured with a circular arc-shaped cross-section profile.

4 Claims, 11 Drawing Sheets

VEHICLE TRIM STRUCTURE

CROSS-REFERENCE TO RELATED APPLICATION

This application is based on and claims priority under 35 USC 119 from Japanese Patent Application No. 2018-180743 filed on Sep. 26, 2018, the disclosure of which is incorporated by reference herein.

BACKGROUND

Technical Field

The present disclosure relates to a vehicle trim structure.

Related Art

Japanese Patent No. 3579588 discloses an automobile door trim in which a thickened portion is formed along substantially the entire length of an upper edge flange of a lower base in order to provide rigidity. A protrusion is formed along substantially the entire length of an upper edge of the flange so as to provide the thickened portion with a step. The protrusion is pressure bonded (contacted against) an armrest portion formed to a center base from below. The contact position accordingly does not change even if the lower base warps or deforms.

However, in the trim structure disclosed in Japanese Patent No. 3579588, there is a possibility that inward tucking or outward splaying of a contact portion occurring as a consequence of the profile of the center base, an assembly path of the lower base, the assembly method, or the like might cause a large angle of warp in the lower base, resulting in a gap through which it is possible to see all the way through to a front face side of the lower base, which would be detrimental to the appearance.

SUMMARY

In consideration of the above circumstances, an object of the present disclosure is to provide a vehicle trim structure in which the appearance of a contact location between a vehicle trim and a counterpart member is improved without being affected by the profile of the counterpart member, an assembly path, or an assembly method.

A vehicle trim structure of a first aspect of the present disclosure includes a flange provided at a vehicle trim and configured to contact a counterpart member, wherein an end portion of the flange that is configured to contact the counterpart member is formed from a soft material, and a contact face of the end portion is configured with a circular arc-shaped cross-section profile.

In the vehicle trim structure of the first aspect, the end portion of the flange on the vehicle trim that contacts the counterpart member is formed from a soft material, and the contact face of the end portion is configured with the circular arc-shaped cross-section profile. Accordingly, even if the manner in which the counterpart member and the end portion of the flange contact each other varies as a consequence of the profile of the counterpart member or as a consequence of a poor positional relationship between the end portion and the counterpart member, a contact angle between the two remains substantially constant. The appearance of the contact location between the vehicle trim and the counterpart member is therefore improved in comparison to cases in which, for example, the contact angle can vary by a large amount.

The flange may adopt a state either tucked inward or splayed outward (tilted outward) as a consequence of the profile of the counterpart member, the assembly path, assembly method, or the like. Even if the amount of tucking or the amount of splaying varies, the contact angle remains substantially constant. The appearance of the contact location between the vehicle trim and the counterpart member is therefore improved in comparison to cases in which, for example, the contact angle can vary by a large amount.

As described above, the vehicle trim structure is capable of improving the appearance of the contact location between the vehicle trim and the counterpart member without being affected by the profile of the counterpart member, the assembly path, or the assembly method.

A vehicle trim structure of a second aspect of the present disclosure is the vehicle trim structure of the first aspect, wherein a stylized face side of the end portion of the flange has a planar profile, and an opposite side from the stylized face side has a circular arc shape.

In the vehicle trim structure of the second aspect, the stylized face side of the end portion of the flange that contacts the counterpart member has a planar profile, and the opposite side thereto is configured with a circular arc shape, thereby improving the appearance of the end portion of the flange when viewed from its outer side. This enables the appearance of the contact location between the vehicle trim and the counterpart member to be improved.

A vehicle trim structure of a third aspect of the present disclosure is the vehicle trim structure of either the first aspect or the second aspect, wherein the vehicle trim is an onboard device cover, and the counterpart member is a vehicle interior decorative cover.

In the vehicle trim structure of the third aspect, the appearance of the contact location between the onboard device cover configuring the vehicle trim and the vehicle interior decorative cover configuring the counterpart member is improved.

A vehicle trim structure of a fourth aspect of the present disclosure is the vehicle trim structure of any one of the first aspect to the third aspect, wherein the end portion of the flange is configured to contact an outwardly visible face of the counterpart member.

In the vehicle trim structure of the fourth aspect, since the end portion of the flange of the vehicle trim contacts the outwardly visible face of the counterpart member, an effect of improving the appearance of the contact location between the vehicle trim and the counterpart member is further enhanced.

The present disclosure is capable of providing a vehicle trim structure in which the appearance of a contact location between a vehicle trim and a counterpart member is improved without being affected by the profile of the counterpart member, the assembly path, or the assembly method.

BRIEF DESCRIPTION OF THE DRAWINGS

Exemplary embodiments of the present disclosure will be described in detail based on the following figures, wherein.

DETAILED DESCRIPTION

Explanation follows regarding a vehicle trim structure according to an exemplary embodiment of the present disclosure, with reference to FIG. 1 to FIG. 7.

Vehicle Trim Structure

Figure 1:
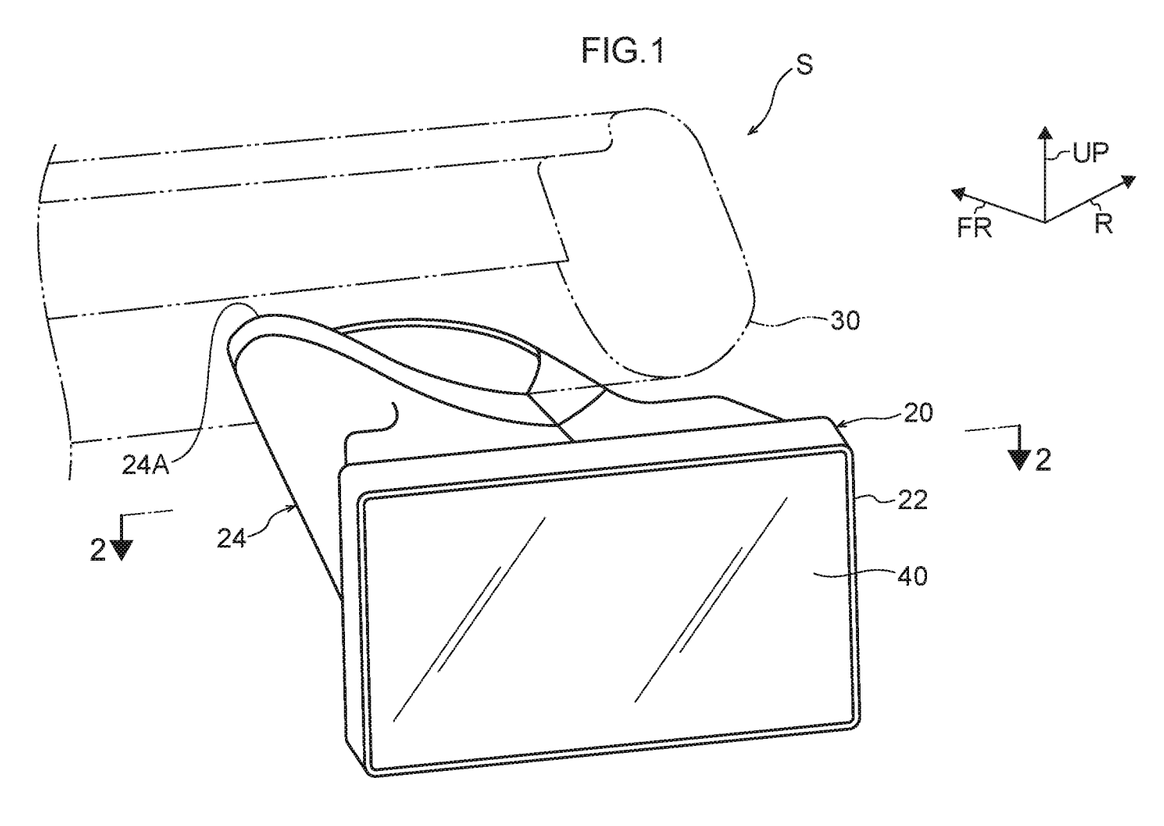
FIG. 1 is a perspective view illustrating an onboard device cover and a vehicle interior decorative cover applied with a vehicle trim structure according to an exemplary embodiment of the present disclosure.
Figure 2:
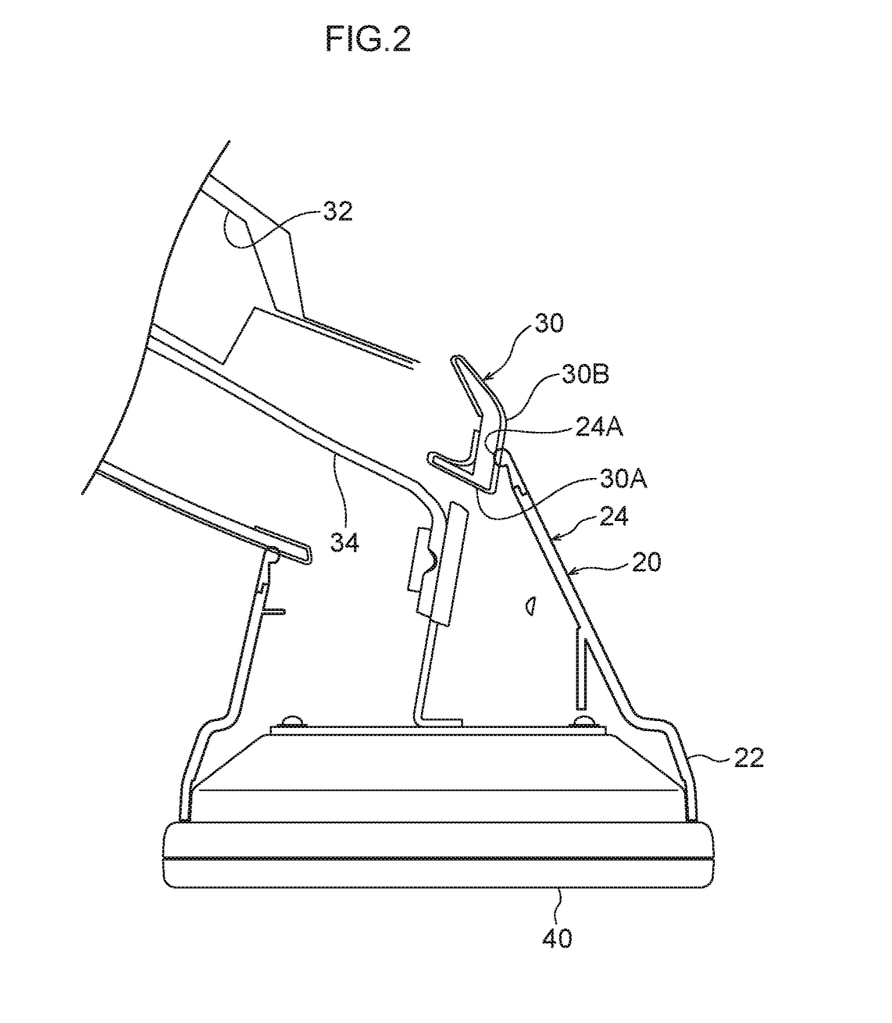
FIG. 2 is a cross-section taken along line 2-2 in FIG. 1.
Figure 3:
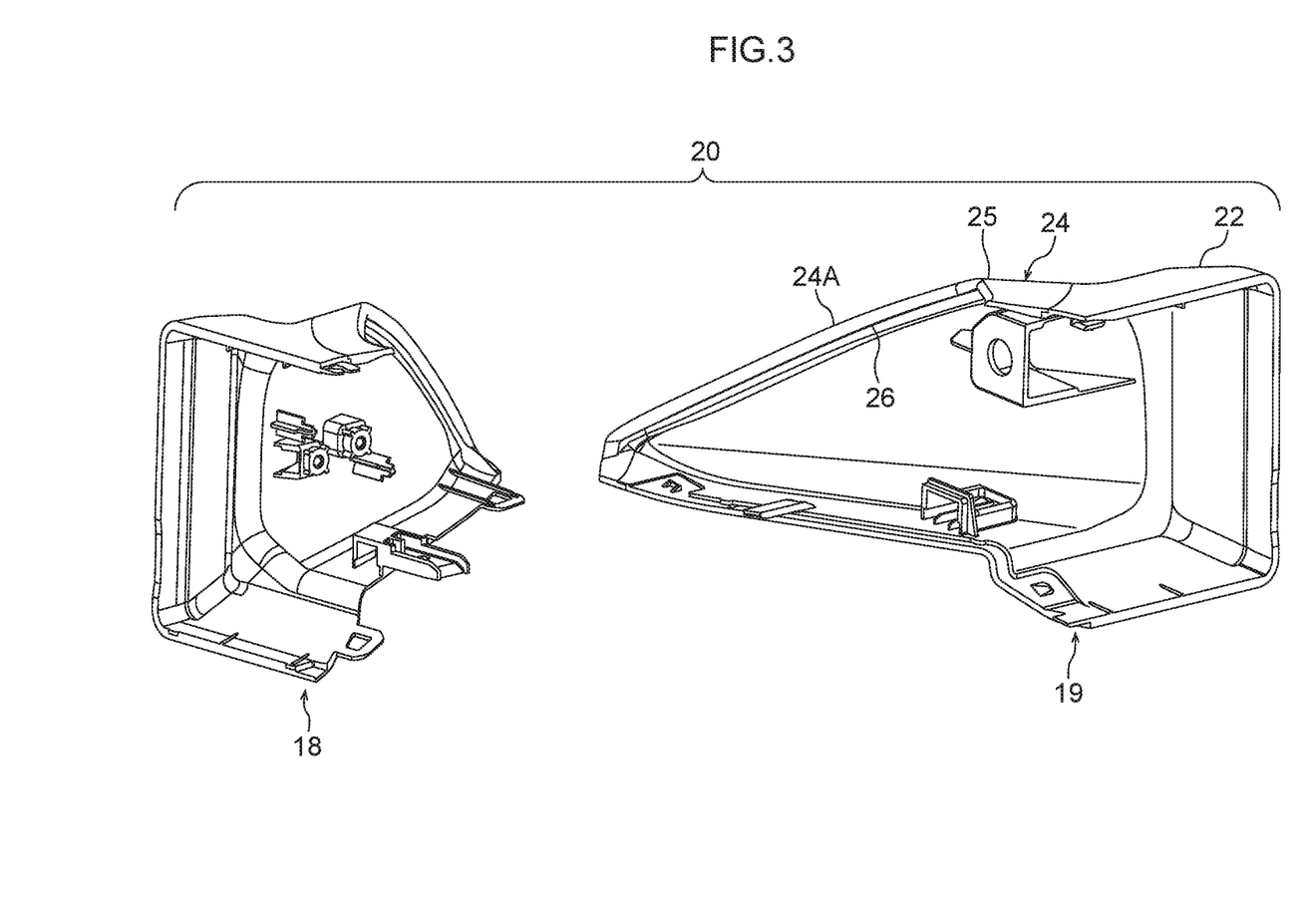
FIG. 3 is an exploded perspective view of the onboard device cover illustrated in FIG. 1.
Figure 4:
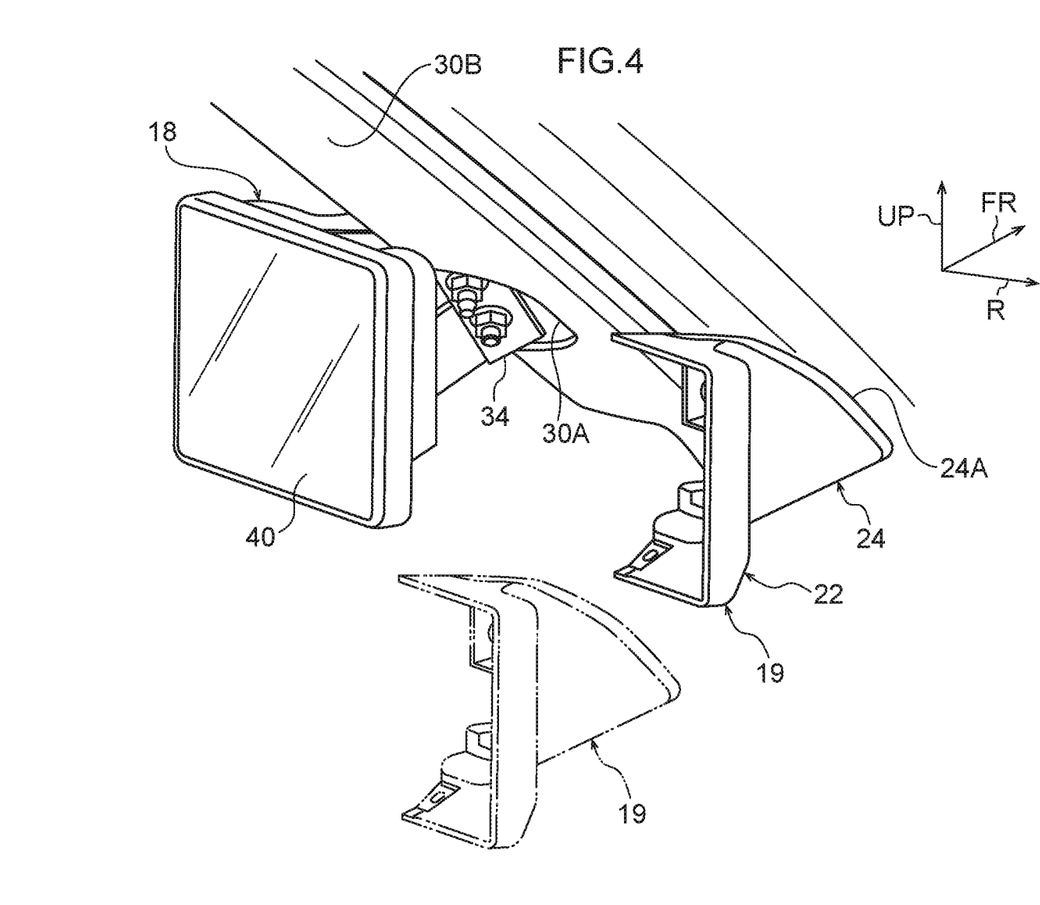
FIG. 4 is a perspective view of the onboard device cover illustrated in FIG. 1 to illustrate an example of a procedure for attaching the onboard device cover to an onboard device.

As illustrated in FIG. 1 to FIG. 3, a vehicle trim structure S of the present exemplary embodiment includes an onboard device cover 20 (also referred to hereafter as the "device cover 20" as appropriate), serving as an example of a vehicle trim, and a vehicle interior decorative cover 30 (also referred to hereafter as the "interior decorative cover 30" as appropriate), serving as an example of a counterpart member. The vehicle trim structure S is a trim structure used to improve the appearance of a contact location between the onboard device cover 20 and the vehicle interior decorative cover 30.

In the drawings, the arrow UP indicates a vehicle upper side, the arrow FR indicates a vehicle front side, and the arrow R indicates a vehicle right side.

The vehicle interior decorative cover 30 will be described first, after which the onboard device cover 20 will be described.

Vehicle Interior Decorative Cover

As illustrated in FIG. 1, the interior decorative cover 30 of the present exemplary embodiment is a cover member used to cover a front pillar 32, forming framework of a vehicle body, from the vehicle cabin inside. The interior decorative cover 30 is formed with an opening 30A to allow a bracket 34 extending from the front pillar 32 toward the vehicle cabin inside to pass through the interior decorative cover 30. The bracket 34 is used to attach a display 40 (or monitor), serving as an example of an onboard device. For example, information (images) from the vehicle exterior are displayed on the display 40.

Onboard Device Cover

As illustrated in FIG. 1 to FIG. 3, the device cover 20 of the present exemplary embodiment is a cover member used to cover the bracket 34 and wiring for the display 40. The device cover 20 includes a frame-shaped frame portion 22 into which the display 40 is fitted, and a tube-shaped flange 24 extending from the frame portion 22.

The frame portion 22 is formed in a frame shape from a hard resin material, and is formed with a size such that a gap is not formed between the frame portion 22 and the display 40 when the display 40 has been fitted in.

The flange 24 is formed in a tube shape from a hard resin material. An end portion 24A side of the flange 24 on the opposite side of the flange 24 to the frame portion 22 is formed from a soft resin material (for example rubber or a rubber-like elastic body). Note that the end portion 24A of the flange 24 is a portion that contacts an outwardly visible face 30B of the interior decorative cover 30 (see FIG. 5 to FIG. 7).

The flange 24 is formed from the same resin material as the frame portion 22, with the exception of the vicinity of the end portion 24A. Note that the present disclosure is not limited to the above configuration, and the flange 24 (excluding the end portion 24A) may be formed from a different resin material to that of the frame portion 22.

In the present exemplary embodiment, the flange 24 and the end portion 24A thereof are formed by two-color molding. The present disclosure is not limited to such a configuration, and alternatively, the flange 24 and the end portion 24A thereof may be joined together at a later stage.

Figure 5:
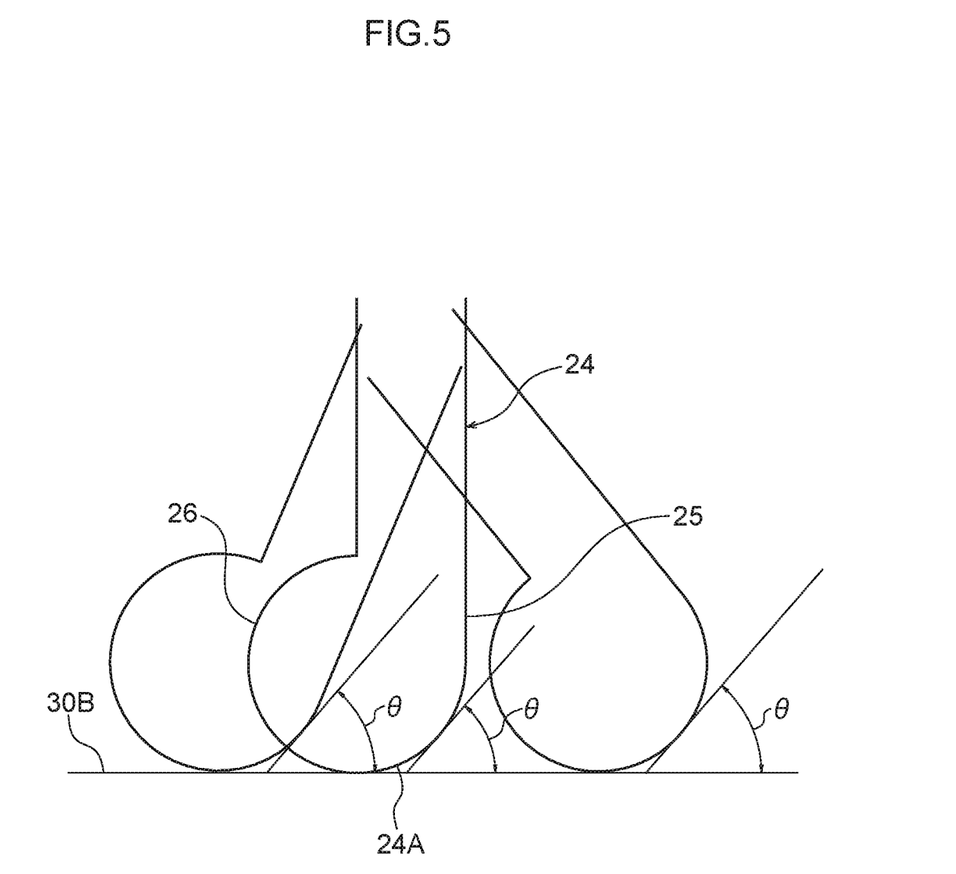
FIG. 5 is an enlarged cross-section of a flange of an onboard device cover.

As illustrated in FIG. 2 and FIG. 5, a contact face of the end portion 24A of the flange 24 is configured with a circular arc-shaped cross-section profile. Specifically, the end portion 24A of the flange 24 has a planar profile on a stylized face 25 side, and has a substantially semicircular circular arc-shaped profile at a face 26 on the opposite side thereto.

As illustrated in FIG. 3, the device cover 20 is formed by two connected cover members 18, 19. However, the present disclosure is not limited to such a configuration. The device cover 20 may be configured by connecting together three or more cover members, or may be configured by a single cover member.

Explanation follows regarding operation and advantageous effects of the present exemplary embodiment.

In the vehicle trim structure S, the end portion 24A of the flange 24 of the device cover 20, in other words the end portion 24A that contacts the outwardly visible face 30B (vehicle cabin side face) of the interior decorative cover 30, is formed from a soft material, and the contact face of the end portion 24A is configured with a circular arc-shaped cross-section profile. Accordingly, even if the manner in which the outwardly visible face 30B and the end portion 24A of the flange 24 contact each other varies as a consequence of the profile of the interior decorative cover 30 or as a consequence of a poor positional relationship between the end portion 24A and the interior decorative cover 30, a contact angle θ between the two remains substantially constant. The appearance of the contact location between the device cover 20 and the interior decorative cover 30 is therefore improved in comparison to cases in which, for example, the contact angle θ can vary by a large amount.

Figure 6:
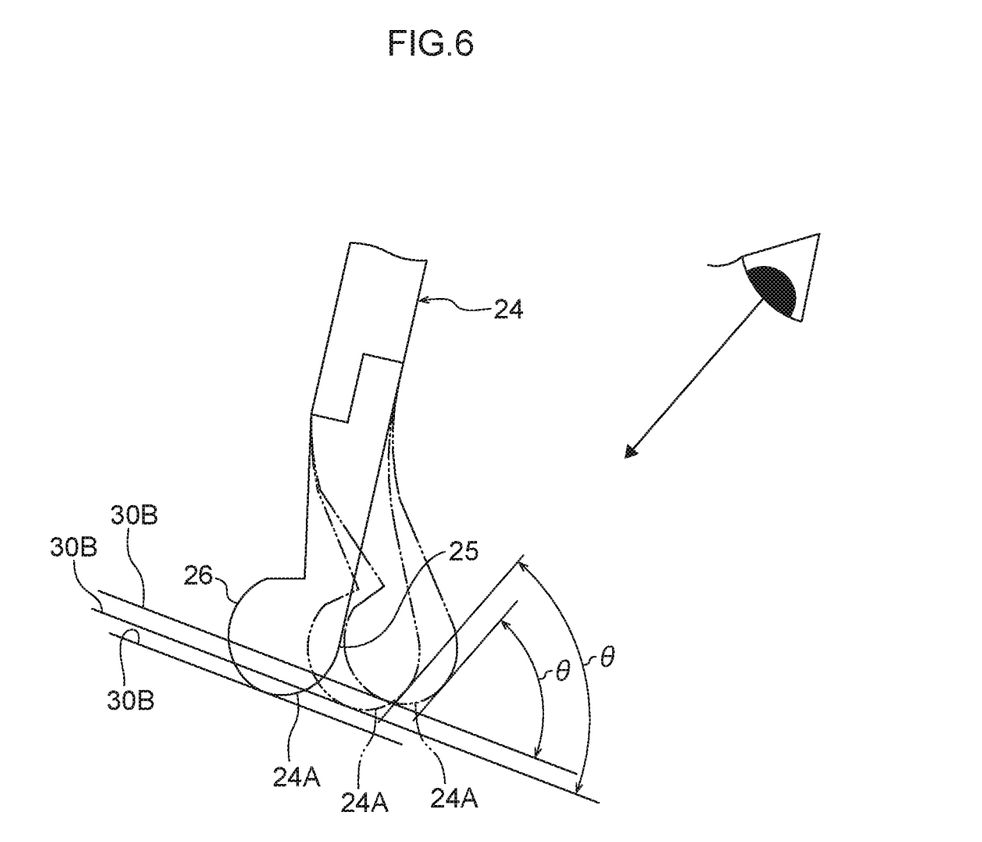
FIG. 6 is an enlarged cross-section of a flange of an onboard device cover to illustrate outward splaying of the flange in stages.
Figure 7:
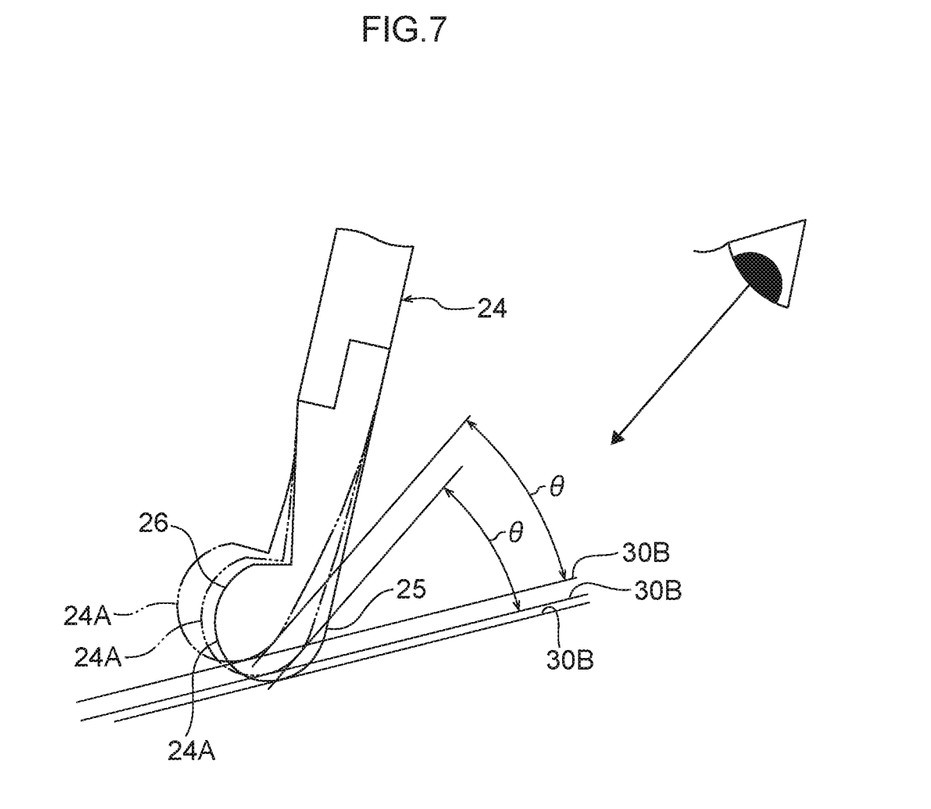
FIG. 7 is an enlarged cross-section of a flange of an onboard device cover to illustrate inward tucking of the flange in stages.

Moreover, in the vehicle trim structure S, as illustrated in FIG. 5 to FIG. 7, the flange 24 may adopt a state either tucked inward or splayed outward (tilted outward) as a consequence of the profile of the interior decorative cover 30, the assembly path, assembly method, or the like. Even if the amount of tucking or the amount of splaying varies, the contact angle θ remains substantially constant. The appearance of the contact location between the device cover 20 and the interior decorative cover 30 is therefore improved in comparison to cases in which, for example, the contact angle θ can vary by a large amount.

As described above, the vehicle trim structure S enables the appearance of the contact location between the device cover 20 and the interior decorative cover 30 to be improved without being affected by the shape of the interior decorative cover 30, assembly path, or assembly method. The vehicle trim structure S also suppresses the appearance of gaps between the device cover 20 and the interior decorative cover 30, thus suppressing the interior thereof from becoming visible.

In the vehicle trim structure S, the stylized face 25 side of the end portion 24A of the flange 24 is configured with a planar profile, and the face 26 on the opposite side is configured with a circular arc shape, thereby improving the appearance of the end portion 24A of the flange 24 when viewed from its outer side. This enables the appearance of the contact location between the device cover 20 and the interior decorative cover 30 to be improved.

Furthermore, in the vehicle trim structure S, since the end portion 24A of the flange 24 of the device cover 20 contacts the outwardly visible face 30B of the interior decorative cover 30, an effect of improving the appearance of the contact location between the device cover 20 and the interior decorative cover 30 is further enhanced.

Moreover, in the device cover 20 of the present exemplary embodiment, the flange 24 and the end portion 24A thereof are formed by two-color molding. Accordingly, for example, the appearance of movement (movement during inward tucking or outward splaying) of the end portion 24A of the flange 24 is improved in comparison to configurations in which the flange 24 is formed by assembling together component parts.

Figure 8:
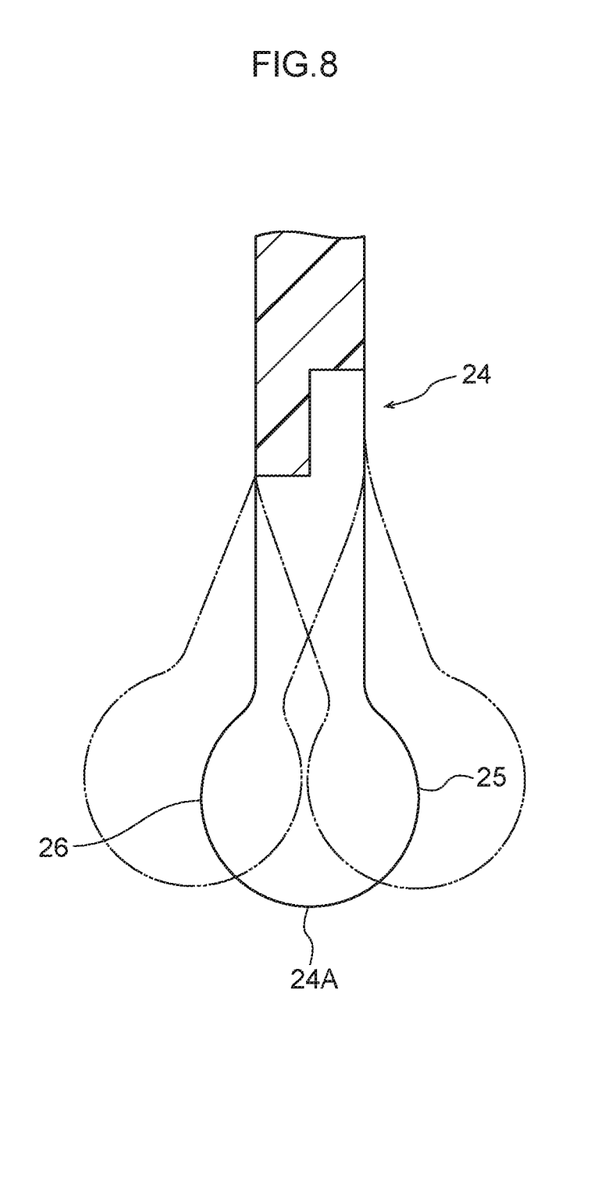
FIG. 8 is an enlarged cross-section illustrating a modified example of a flange of an onboard device cover.

Although the stylized face 25 side of the end portion 24A of the flange 24 is configured with a planar profile in the exemplary embodiment described above, the present disclosure is not limited to such a configuration. For example, as illustrated in FIG. 8, the stylized face 25 side of the flange 24 may be configured in a substantially semicircular circular arc shape. In other words, the cross-section profile of the end portion 24A of the flange 24 may be a profile with a rounded head. The principle advantageous effects of the present disclosure can still be obtained in such cases.

Figure 9:
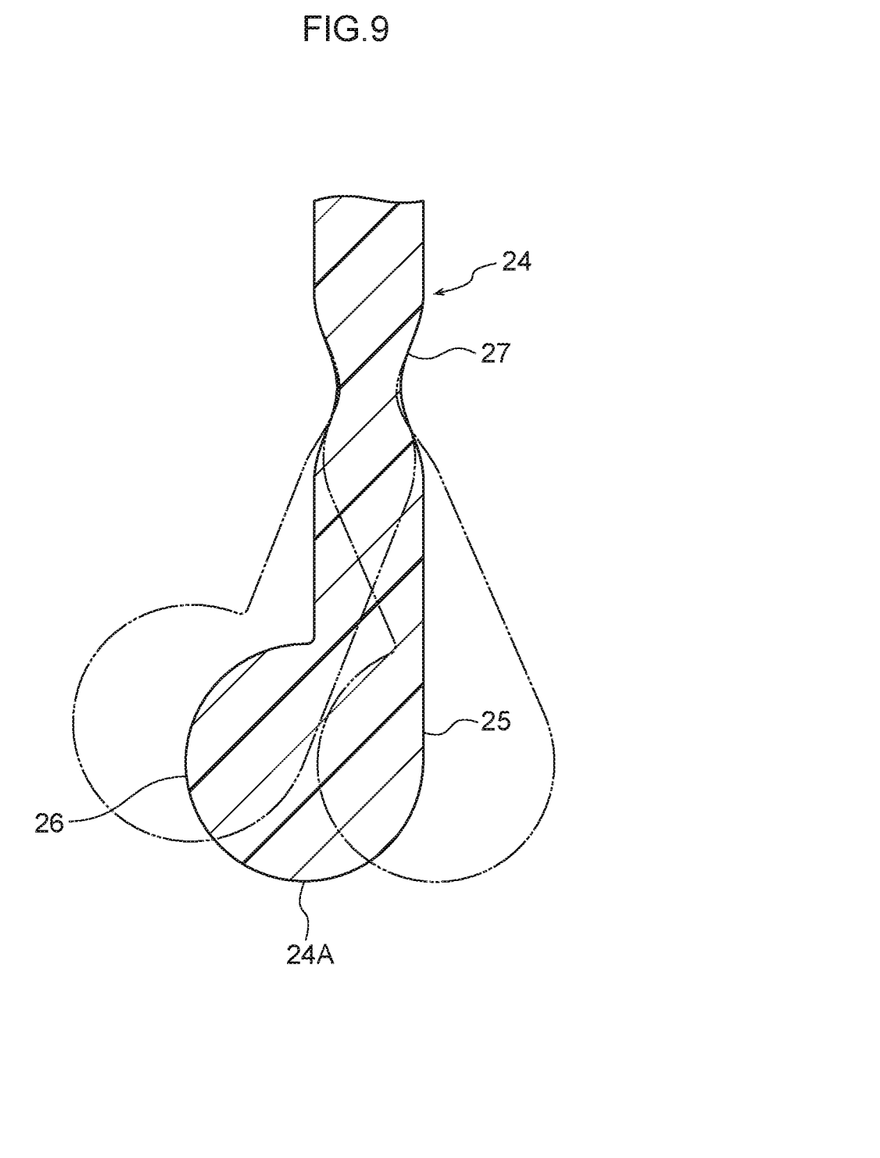
FIG. 9 is an enlarged cross-section illustrating another modified example of a flange of an onboard device cover.

Although the end portion 24A of the flange 24 is formed from a soft resin material in the exemplary embodiment described above, the present disclosure is not limited to such a configuration. For example, as illustrated in FIG. 9, the entire flange 24 may be formed from a hard resin material, with a thinned portion 27 being formed on the end portion 24A side of the flange 24. Such a configuration facilitates deformation of the flange 24 about the thinned portion 27. In addition to the principle advantageous effects of the present disclosure, the manufacturing process is simplified, and material costs can be suppressed since the flange 24 can be formed from a single resin material.

Figure 10:
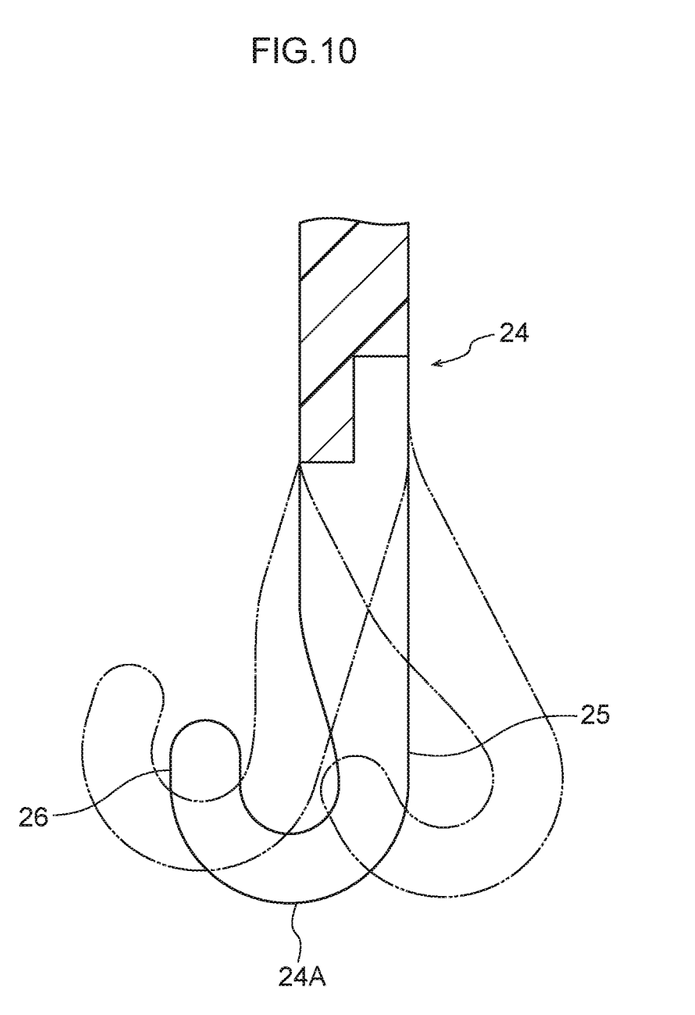
FIG. 10 is an enlarged cross-section illustrating another modified example of a flange of an onboard device cover.
Figure 11:
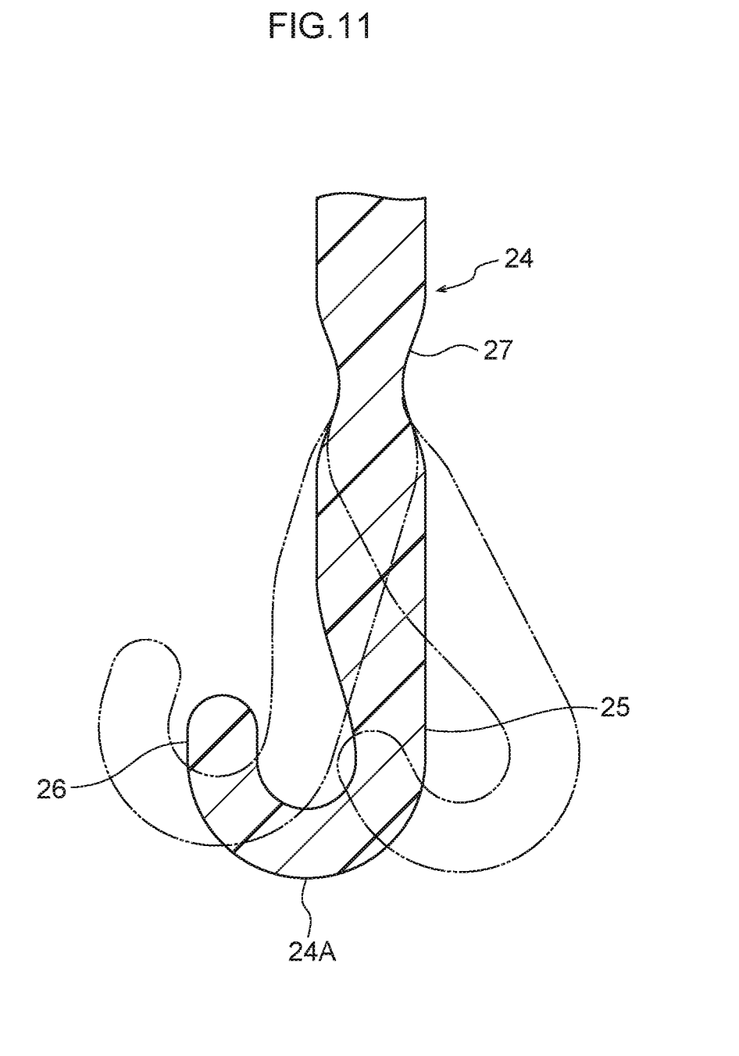
FIG. 11 is an enlarged cross-section illustrating another modified example of a flange of an onboard device cover.

In the exemplary embodiment described above, the face 26 on the opposite side to the end portion 24A of the flange 24 is configured in a substantially semicircular circular arc shape. This encompasses cases in which, for example, the end portion 24A has a profile with a hollow interior, as illustrated in FIG. 10. Note that the cross-section profile of the end portion 24A illustrated in FIG. 10 corresponds to a substantially J-shaped profile. Alternatively, as illustrated in FIG. 11, an end portion 24A with a J-shaped cross-section profile may be formed with the thinned portion 27 described above. The principle advantageous effects of the present disclosure can still be obtained in such cases.

Although explanation has been given regarding an exemplary embodiment of the present disclosure, this exemplary embodiment is merely an example, and various modifications may be implemented within a range not departing from the spirit of the present disclosure. The scope of rights encompassed by the present disclosure is obviously not limited by the above exemplary embodiment.

What is claimed is:

1. A vehicle trim structure, comprising:
   a flange provided at a vehicle trim and configured to contact a counterpart member,
   wherein an end portion of the flange that is configured to contact the counterpart member is formed from a soft material, and a contact face of the end portion is configured with a circular arc-shaped cross-section profile,
   wherein the end portion of the flange is configured to contact an outwardly visible face of the counterpart member.

2. The vehicle trim structure of claim 1, wherein a stylized face side of the end portion of the flange has a planar profile, and an opposite side from the stylized face side has a circular arc shape.

3. The vehicle trim structure of claim 1, wherein:
   the vehicle trim is an onboard device cover; and
   the counterpart member is a vehicle interior decorative cover.

4. The vehicle trim structure of claim 2, wherein:
   the vehicle trim is an onboard device cover; and
   the counterpart member is a vehicle interior decorative cover.

* * * * *